US006185507B1

United States Patent
Huber et al.

(10) Patent No.: US 6,185,507 B1
(45) Date of Patent: Feb. 6, 2001

(54) MICROPROCESSOR, IN PARTICULAR FOR USE IN A CHIP CARD, WITH A CONTROL UNIT AND WITH A HOUSING SURROUNDING THE CONTROL UNIT

(75) Inventors: Michael Huber, Nittendorf/Undorf; Peter Stampka, Schwandorf-Klardorf; Josef Heitzer, Bach, all of (DE)

(73) Assignee: Siemens Aktiengesellschaft, Munich (DE)

(*) Notice: Under 35 U.S.C. 154(b), the term of this patent shall be extended for 0 days.

(21) Appl. No.: 09/255,991

(22) Filed: Feb. 23, 1999

Related U.S. Application Data

(63) Continuation of application No. PCT/DE97/01457, filed on Jul. 10, 1997.

(30) Foreign Application Priority Data

Aug. 23, 1996 (DE) .............................................. 196 34 133

(51) Int. Cl.⁷ .................................................. G01N 27/10
(52) U.S. Cl. .............................. 702/30; 702/31; 702/32; 714/30; 713/194
(58) Field of Search .................................. 702/30–32, 22, 702/23, 57, 64, 65, 116, 117, 122, 124, 126, 183, 185, 186, 189, 193, FOR 103, FOR 104, FOR 106, FOR 134, FOR 141, FOR 170, FOR 171, FOR 115, FOR 116–FOR 118; 714/30, 34, 47, 21, 37; 713/193, 194, 200; 422/62, 68.1, 82.01, 98, 105, 108; 700/266; 380/FOR 103, FOR 104; 235/382, 438–441; 73/866; 902/25–29

(56) References Cited

U.S. PATENT DOCUMENTS

| | | | | |
|---|---|---|---|---|
| 5,159,629 | * | 10/1992 | Double et al. | 713/194 |
| 5,353,350 | * | 10/1994 | Unsworth et al. | 713/194 |
| 5,465,349 | * | 11/1995 | Geronimi et al. | 714/30 |

FOREIGN PATENT DOCUMENTS

| | | |
|---|---|---|
| 4018688A1 | 1/1991 | (DE) . |
| 4115398A1 | 11/1992 | (DE) . |
| 4212111A1 | 10/1993 | (DE) . |
| 0481881A1 | 4/1992 | (EP) . |
| 0565480A2 | 10/1993 | (EP) . |
| 0718794A1 | 6/1996 | (EP) . |
| 2580834 | 10/1986 | (FR) . |
| 2668274 | 4/1992 | (FR) . |

OTHER PUBLICATIONS

"An ISFET–FIA system for high precision pH recording", S. Koch et al., Sensors and Actuators B, 15–16, 1993, pp. 68–74. (No Month).

* cited by examiner

Primary Examiner—Hal Wachsman
(74) Attorney, Agent, or Firm—Herbert L. Lerner; Laurence A. Greenberg; Werner H. Stemer

(57) ABSTRACT

A microprocessor has a control unit with a housing surrounding the control unit. The invention also relates to a chip card having such a microprocessor that is protected against manipulations. At least one sensor indicates ambient states and is connected to the control unit and is provided in a region of the housing of the microprocessor. The control unit is configured in such a way that it can be placed in an inactive state if a measurement signal that indicates a predetermined ambient state is and/or is not fed to the control unit from the sensor.

7 Claims, 1 Drawing Sheet

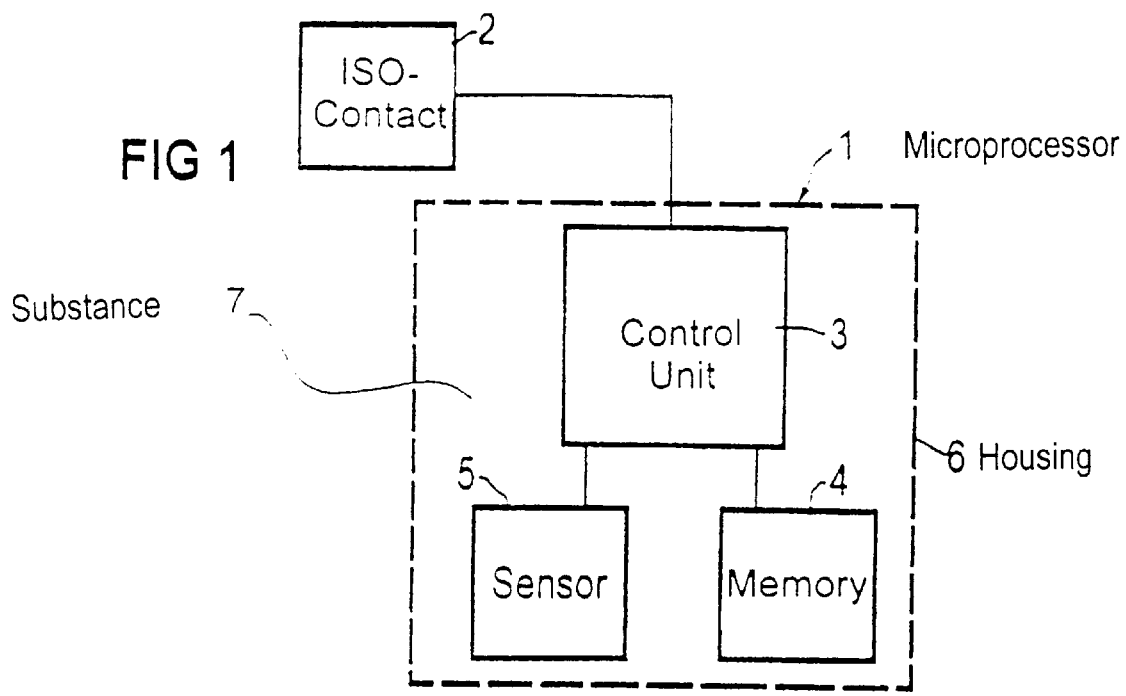
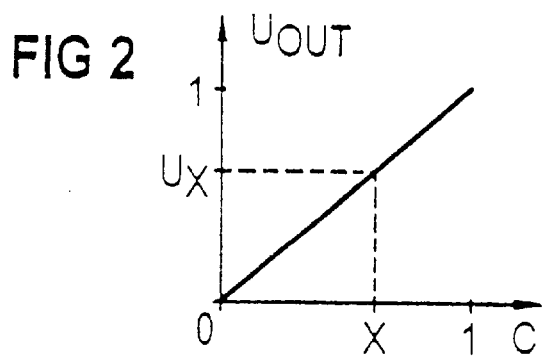
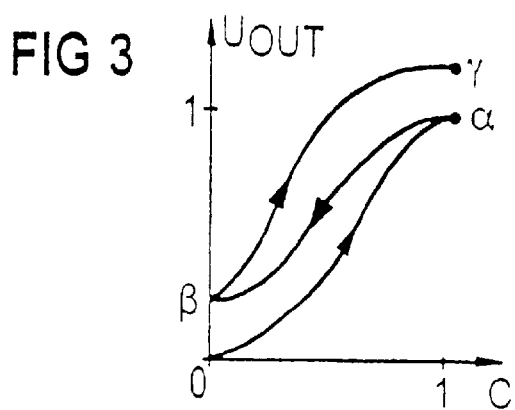

MICROPROCESSOR, IN PARTICULAR FOR USE IN A CHIP CARD, WITH A CONTROL UNIT AND WITH A HOUSING SURROUNDING THE CONTROL UNIT

CROSS-REFERENCE TO RELATED APPLICATION

This is a continuation of copending International Application PCT/DE97/01457, filed Jul. 10, 1997, which designated the United States.

BACKGROUND OF THE INVENTION

1. Field of the Invention

The invention relates to a microprocessor, in particular for use in a chip card, with a control unit and with a housing surrounding the control unit. Furthermore, the invention relates to a chip card with such a microprocessor.

To an increasing degree, payment processes for relatively small amounts of money are processed with the aid of a chip card system. In this respect, a chip card has the function of a "money storage facility". There being provided on a chip card a microprocessor which has a control unit, a data memory for storing the amount of money stored on the chip card, interfaces, in particular for inputting and outputting data which are relevant to payments, a control device for controlling the processing procedure of the data which are processed in conjunction with the chip card, and an instruction memory which stores the operating program for the control device. Such chip card systems are used in the field of credit cards, in pay TV application systems and also in systems for monitoring access to devices concerned with security and to buildings.

Shortly after the introduction of the first chip card systems, attempts were made to manipulate chip cards in order to obtain illegitimate advantages with such manipulated chip cards. For example, attempts have been made to simulate chip cards and to provide their data memories with a manipulated credit balance.

This has been counteracted by encrypting the data present in the data memory of the chip card in such a way that it is no longer possible to simulate the data. For this purpose, algorithms such as DES (Data Encryption Standard), PES (Proposed Encryption Standard), DSA (Digital Signature Algorithm), DEA (Data Encryption Algorithm), and RSA (Reversed Shamir-Adelman Cryptoalgorithm) are used.

However, a significant weakness of known chip card systems continues to be that the microprocessor, which is surrounded by a housing, can easily be exposed. To do this, the housing of the microprocessor is subjected to an aggressive substance, such as an acid for example, over a specific period of time, so that the housing is etched away and the microprocessor is exposed. The structural configuration of the exposed microprocessor can then be analyzed. In order to do this, different input signals can be applied to the terminals of the microprocessor, so that information on the program, present in the instruction memory, for controlling the processing procedure can be acquired. This information can be used to decrypt, for example, the data in the data memory.

Published, European Patent Application EP 0 565 480 A2 discloses how to use indicator elements in chip cards which react in an unambiguous and discernible fashion to physical influences or other influences aimed at destroying the function of chip the cards.

Published, Non-Prosecuted German Patent Application DE 41 15 398 A1 discloses a method for manufacturing a biosensor with a planarized surface which reduces the risk of diaphragms tearing. It includes the steps of producing a gate insulator, producing and structuring a polysilicon layer, implementing a source and a drain, exposing an active gate region, arranging an ISFET within a housing in such a way that the active gate region of the ISFET comes to be situated within a window of the housing, and applying the biological or biochemical diaphragm to the active gate region.

The paper "An ISFET-FIA System for High Precision pH Recording" in Sensors and Actuators B, 15–16 (1993) 68–74 (P. Woias et al.) discloses an ISFET sensor for measuring a pH value in a fluid which has a high degree of stability and high measuring accuracy even at low flow velocities.

Published, European Patent Application EP 0 481 881 A1, corresponding to U.S. Pat. No. 5,465,349, discloses an integrated circuit which has a program memory, a data memory, an I/O port and a register. The register stores the signals of the sensors for unusual operating conditions. When unusual operating conditions occur, the microprocessor stops operating.

SUMMARY OF THE INVENTION

It is accordingly an object of the invention to provide a microprocessor, in particular for use in a chip card, with a control unit and with a housing surrounding the control unit that overcomes the above-mentioned disadvantages of the prior art devices of this general type, which are protected against manipulation.

With the foregoing and other objects in view there is provided, in accordance with the invention, a microprocessor, including: a control unit; a housing surrounding the control unit; at least one sensor connected to the control unit and disposed in a region of the housing and outputting a sensor measurement signal; at least one substance disposed in the region of the housing and being detectable by the at least one sensor, the at least one substance having at least two components, at least one of the at least two components present in a predefined concentration detectable by the at least one sensor; a memory connected to the control unit, the sensor measurement signal generated by the at least one sensor containing a value reflective of the predefined concentration being received by the control unit and stored in the memory; and The control unit going into an inactive state if the sensor measurement signal differs from a predefined threshold concentration.

The object is in particular achieved according to the invention in that at least one sensor which indicates ambient states and which is connected to the control unit is provided in the region of the housing of the microprocessor. The control unit is configured in such a way that it can be placed in an inactive state if a measurement signal that indicates a predetermined ambient state is fed to it from the sensor.

Alternatively, the control unit can also be configured in such a way that it can be placed in an inactive state if no measurement signal that indicates a specific ambient state is fed to it from the sensor.

The invention is based on the basic idea of providing a chip card with a microprocessor which can no longer easily be exposed by chemical and/or physical methods without significantly deactivating or destroying the microprocessor itself. For this purpose, a sensor that is connected to the control unit is provided. The control unit regularly senses the sensor and checks whether the sensor is indicating an ambient state that corresponds, for example, to the ambient state when the microprocessor was fabricated. If the ambient state in the region of the sensor is modified, for example by applying a chemical, the signal originating from the sensor changes, and this is sensed and detected by the control unit. In this case, the control unit goes into an inactive state, so that, even when a microprocessor has been exposed, its function can no longer easily be discerned. With regard to the above, the term "control unit" is to be understood in a broad sense, that is to say any component of the microprocessor or of the chip card may be deactivated as long as it is ensured that access to the data or to the structure of the data memory, program memory or control unit is prevented or made more difficult.

According to the invention, it is also possible to provide a sensor which indicates as an "ambient state", in particular, the presence of typical chemicals used for exposing microprocessors. For example, sensors that respond to acids can be used. If such a sensor indicates the presence of an acid in the region of the housing, it can be assumed that an attempt has been made to manipulate the microprocessor. This is sensed by the control unit, in response to which it goes into an inactive state.

According to the invention, the two embodiments are also possible at the same time, at least two sensors or one sensor with a double function then being provided. In this case, the control unit is configured in such a way that it can be placed in an inactive state if one sensor feeds it a measurement signal which indicates a predetermined "suspicious" ambient state and/or if the other sensor stops sending it a measurement signal which indicates a predetermined "normal" ambient state. The control device is then placed in an inactive state if at least one of the sensors indicates an ambient state which differs from the normal state.

The sensor, according to the invention, which indicates a predetermined ambient state is expressly not restricted here to a sensor which indicates the presence or absence of a chemical. Sensors that indicate physical changes are also conceivable, it being possible to provide, in particular pressure sensors or mechanical sensors. Such mechanical sensors can be constructed, for example, as fine conducting wires in the region of the housing, which wires inevitably have to be destroyed when the microprocessor is being exposed by scraping.

In a refinement of the invention, a substance which can be perceived by a sensor is provided in the region of the housing, it also being possible for the substance, to have at least two components, at least one of which can be perceived by the sensor. By providing such a substance, it is possible to bring about a defined ambient state at the time of fabrication of the microprocessor, it being possible, to encode an ambient state when the substance with a plurality of components is implemented, by changing the mixing ratios of the same. In the case of a sensor that reacts quantitatively to chemical compounds, it is thus possible to sense the presence of a substance that has a specific quantitative composition. With the last-mentioned refinement, it is possible, in a particularly simple way, to prevent a situation in which, in the case of manipulation, the microprocessor is exposed in a first step and, in the second step, a substance is placed in the region of the sensor in order to activate the microprocessor again. Even given knowledge of the components of the substance, it is virtually impossible to simulate them in the original composition. Such simple encoding increases considerably the security of the microprocessor according to the invention.

In a further refinement of the invention, the sensor is provided in the interior of the housing. Here, according to this refinement of the invention, it is particularly advantageous to embed the substance to which the sensor responds in the actual covering material of the microprocessor and/or in the material of the housing. When the housing is opened, the sensor senses this immediately, so that the control unit is placed in an inactive state, in which its properties cannot be discerned.

According to a particularly advantageous modification of the invention, the sensor is configured as a biosensor. Such sensors are already known in the prior art and may be configured in a reliable, accurate and particularly small form, so that they are made suitable for use in conjunction with microprocessors. Thus, for example, sensors for measuring sugar in human blood are known and these sensors can be used easily and advantageously in conjunction with the microprocessor according to the invention. Such biosensors can measure quickly and easily determine both the existence of a substance and the individual concentrations of the substances in a mixture of substances. As a result, biosensors can be used both as qualitative sensors, which react only to the presence of a specific substance, and as quantitative sensors, with which concentrations of substances can be detected.

According to a particularly simple embodiment, the sensor in the microprocessor according to the invention supplies a digital output signal. A sensor of this type is suitable particularly for quantitative analyses. This may be the case, for example, with a sensor that is intended for sensing the application of acid to the housing of the microprocessor.

In a refinement of the microprocessor described above, the sensor can also supply an analog output signal. Particularly in conjunction with a sensor which is disposed separately from the control device or from the housing of the microprocessor. Such a refinement provides increased protection against undesired manipulations, to be precise particularly if the ambient states which are necessary for the operation of the control device and which are sensed by the sensor are stored in the control unit or in the data memory of the microprocessor. The data which characterize the ambient state that is necessary for the operation of the control unit can then in fact be read out only if the sensor keeps the control unit in an active state. However, in the course of a manipulation performed on the microprocessor, the sensor senses the manipulation and switches off the control unit, and thus disables access to the data characterizing the sensor, before these data can be accessed.

A sensor which supplies an analog output signal can also be used particularly easily in conjunction with the known microprocessors, since, in the vast majority of cases, these already have digital/analog converters, which can convert the data of such a sensor in such a way that these data can be processed by the microprocessor.

A sensor which supplies a measurement signal that has a hysteresis character with respect to the repeated sensing of a changing ambient state is quite particularly advantageous in conjunction with the inventive microprocessor which is configured as above. After the sensor has been exposed, this prevents the possibility of the microprocessor being reactivated after restoring an ambient state after the exposure of the sensor. This is because a hysteresis character of the sensor, which is in fact undesirable for sensors, has the result that, in the case of temporally staggered, repeated restoration of an ambient state, for example by removing and re-applying the same characteristic substance in the region of the sensor, the sensor supplies different output signals in each case. Therefore, when an identical substance is re-applied in the region of the sensor, an output signal of the sensor occurs which differs from that occurring, for example when the microprocessor according to the invention was manufactured. The control device is then advantageously set up in such a way that this difference can be sensed and it can thus be determined whether manipulation is taking place in the region of the microprocessor.

Finally, the microprocessor according to the invention is advantageously configured in such a way that a signal that is fed to it from the sensor can be stored permanently. Such storage of a signal, which has been fed to the microprocessor from at least one sensor, is especially appropriate if an ambient state which is indicative of the time of fabrication is to be stored for the comparison with an ambient state at a later time. Such storage is possible particularly easily in the case of the microprocessors known from the prior art since they already have a small electrically programmable read-only memory (PROM), which has previously been used only to store, for example, a serial number.

Other features which are considered as characteristic for the invention are set forth in the appended claims.

Although the invention is illustrated and described herein as embodied in a microprocessor, in particular for use in a chip card, with a control unit and with a housing surrounding the control unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic block diagram of a circuit in a chip card according to the invention;

FIG. 2 is a graph of an output signal of a typical sensor of the chip card; and

FIG. 3 is a graph of an output signal of a further typical sensor of the chip card.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a block circuit diagram of a chip card according to the invention with a microprocessor 1, which is connected to ISO contacts 2, which are provided on the surface of the chip card. The microprocessor 1 has a control unit 3 and a data memory 4. Furthermore, a sensor 5 is provided in a region of the control unit 3. The control unit 3, the data memory 4 and the sensor 5 are disposed in an interior of a housing 6. The housing 6 includes a thermally curable material 7 having a substance to which the sensor 5 responds.

When the chip card is operating, the microprocessor 1 exchanges data from a non-illustrated external memory of a read/write unit, via the ISO (International Standards Organization) contact 2, with data from the data memory 4, and vice versa. During each processing step, the control unit 3 checks whether the sensor 5 responds to the substance present in the housing 6. As long as the sensor 5 responds to the substance present in the housing 6, the control unit 3 maintains operation. As soon as the sensor 5 no longer senses the substance present in the housing 6, for example because the substance has been removed during a manipulation and has been replaced by a substance with another composition, the control unit 3 switches off inevitably and irrevocably. Analysis of the functional procedure within the microprocessor 1 is thus ruled out.

FIG. 2 shows an operational graph of the sensor 5 that can be disposed in the microprocessor 1 according to the invention and in the chip card according to the invention. The abscissa of the graph in FIG. 2 indicates the concentration X of the substances provided in the housing 6. The concentration varies from 0 to 1. The ordinate indicates the scaled output voltage Ux of the sensor as a function of the concentration of the substance in the housing 6. Thus, given the concentration X of the substance in the housing 6, a scaled output voltage Ux is produced. By reference to the output voltage Ux, the control unit 3 can determine whether the substance is present in the surroundings of the sensor 5, and in what concentration.

FIG. 3 shows an operational graph of a sensor that essentially corresponds to the one whose graph is shown in FIG. 2. However, the sensor whose operational graph is illustrated in FIG. 3 has a distinct hysteresis characteristic. This characteristic can be used particularly advantageously with the chip card according to the invention in order to protect against undesired manipulations, as described below.

When the microprocessor 1 is manufactured, the output voltage $U_{OUT}$ of the sensor 5 illustrated in FIG. 3 rises from "0" to the value $\alpha$. The value $\alpha$ is input by the control unit 3, after the manufacture of the microprocessor 1 has been completed, and is permanently burnt into a PROM region of the data memory 4. If the substance surrounding the sensor 5 is removed during a manipulation of the chip card, the output voltage of the sensor 5 drops to the value $\beta$, which is indicated in the region of the ordinate of the diagram shown in FIG. 3. Owing to the hysteresis characteristic of the sensor 5, the value $\beta$ is greater than the output value "0" before the microprocessor 1 was manufactured. When the substance is applied again in the region of the sensor 5, the output voltage of the sensor 5 rises again, specifically to a value $\gamma$, which is greater than the value $\alpha$ which was obtained after the microprocessor 1 was manufactured. This difference is also due to the hysteresis characteristic of the sensor 5.

The difference in the output voltage $(\gamma-\alpha)$ is sensed by the control unit 3 and it concludes there has been a manipulation in the region of the microprocessor 1 if the value $(\gamma-\alpha)$ exceeds a specific limit which is provided in order to compensate for an undesired failure of the chip card owing to an ageing effect of the sensor 5.

What is claimed is:

1. A microprocessor, comprising:

a control unit;

a housing surrounding said control unit;

a sensor connected to said control unit and disposed in a region of said housing and outputting a sensor measurement signal;

at least one substance disposed in said region of said housing and being detectable by said sensor, said at least one substance having at least two components, at least one of said at least two components present in a predefined concentration detectable by said sensor;

a memory connected to said control unit, said sensor measurement signal generated by said sensor containing a value reflective of said predefined concentration being received by said control unit and stored in said memory; and said control unit going into an inactive state if said sensor measurement signal differs from a predefined threshold concentration of said at least one of said at least two components.

2. The microprocessor according to claim 1, wherein said sensor measurement signal has a hysteresis character with respect to a repeated sensing of a changing ambient state.

3. The microprocessor according to claim 1, wherein said housing has an interior and said sensor is disposed in said interior of said housing.

4. The microprocessor according to claim 1, wherein said sensor measurement signal is a digital signal.

5. The microprocessor according to claim 1, wherein said sensor measurement signal is an analog signal.

6. The microprocessor according to claim 1, wherein said memory is a permanent storage memory.

7. A chip card, comprising:
a microprocessor, including:
a control unit;
a housing surrounding said control unit;
a sensor connected to said control unit and disposed in a region of said housing and outputting a sensor measurement signal;
at least one substance disposed in said region of said housing and being detectable by said sensor, said at least one substance having at least two components, at least one of said at least two components present in a predefined concentration detectable by said sensor;
a memory connected to said control unit, said sensor measurement signal generated by said sensor containing a value reflective of said predefined concentration being received by said control unit and stored in said memory; and said control unit going into an inactive state if said sensor measurement signal differs from a predefined threshold concentration of said at least one of said at least two components.

* * * * *